US012669786B2

(12) United States Patent
Orús et al.

(10) Patent No.: US 12,669,786 B2
(45) Date of Patent: Jun. 30, 2026

(54) DETERMINATION OF CONDITION OR CHARACTERISTIC OF A TARGET

(71) Applicant: Multiverse Computing, S.L., Donostia-San Sebastian (ES)

(72) Inventors: Román Orús, Donostia-San Sebastian (ES); Samuel Mugel, Toronto (CA); Serkan Sahin, Donostia-San Sebastian (ES); Saeed Jahromi, Donostia-San Sebastian (ES); Chia-Wei Hsing, Donostia-San Sebastian (ES); Raj Patel, Toronto (CA); Samuel Palmer, Toronto (CA)

(73) Assignee: MULTIVERSE COMPUTING, S.L., Donostia-San Sebastian (ES)

( * ) Notice: Subject to any disclaimer, the term of this patent is extended or adjusted under 35 U.S.C. 154(b) by 1101 days.

(21) Appl. No.: 17/729,575

(22) Filed: Apr. 26, 2022

(65) Prior Publication Data

US 2023/0341824 A1 Oct. 26, 2023

(51) Int. Cl.
*G05B 13/02* (2006.01)
*G06N 3/084* (2023.01)
(52) U.S. Cl.
CPC ........... *G05B 13/027* (2013.01); *G06N 3/084* (2013.01)
(58) Field of Classification Search
CPC ............................... G05B 13/027; G06N 3/084
See application file for complete search history.

(56) References Cited

U.S. PATENT DOCUMENTS

| | | | | |
|---|---|---|---|---|
| 12,067,075 | B1 * | 8/2024 | Harrigan | G06N 10/60 |
| 2021/0081804 | A1 * | 3/2021 | Stojevic | G06N 3/088 |
| 2022/0269751 | A1 * | 8/2022 | Mugel | G06N 10/00 |
| 2022/0414518 | A1 * | 12/2022 | You | G06Q 10/04 |

OTHER PUBLICATIONS

Sommer, et al. (Mar. 17, 2022) "Entangling Solid Solutions: Machine Learning of Tensor Networks for Materials Property Prediction," arXiv:2023.09613v1 (Year: 2022).*

(Continued)

*Primary Examiner* — Jennifer N Welch
(74) *Attorney, Agent, or Firm* — CANTOR COLBURN LLP

(57) ABSTRACT

A device or system configured to: receive a set of data associated with a monitored target, the set of data having N features, where N is a natural number greater than one; input the N features of the received set of data into a trained neural network for determining a condition or characteristic of the target with a plurality of sets of historical data associated with the target, each set of the plurality of sets of historical data having N features, the neural network at least having N inputs and one or more outputs, the neural network having one or more hidden layers, each hidden layer being a tensor network in the form of a matrix product operator, MPO, with a respective plurality of tensors and having a respective predetermined activation function per hidden layer or per tensor in the MPO; and input the N features into the neural network, determining a condition or characteristic of the target by processing the one or more outputs. Also, a device or system configured to train such neural network.

13 Claims, 4 Drawing Sheets

(56) References Cited

OTHER PUBLICATIONS

Araz, et al. (Aug. 6, 2021), "Quantum-inspired event reconstruction with Tensor Networks: Matrix Product States," JHEP, arXiv:2106. 08334v2 (Year: 2021).*

Mugel, et al. (Jun. 30, 2020) "Dynamic Portfolio Optimization with Real Datasets Using Quantum Processors and Quantum-Inspired Tensor Networks," arXiv:2007.00017v1 (Year: 2020).*

Stoudenmire, et al. (May 2017) "Supervised Learning with Tensors Networks," arXiv:1605.05775 (Year: 2017).*

Ajagekar et al. (Quantum Computing Based Hybird Deep Learning for Fault Diagnosis in Electrical Power System, Elsevier, 2021, pp. 1-11).*

* cited by examiner

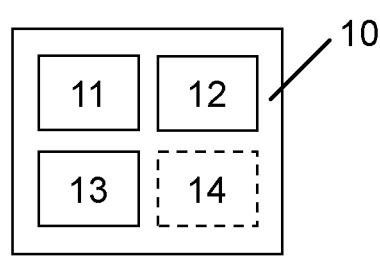
FIG. 1
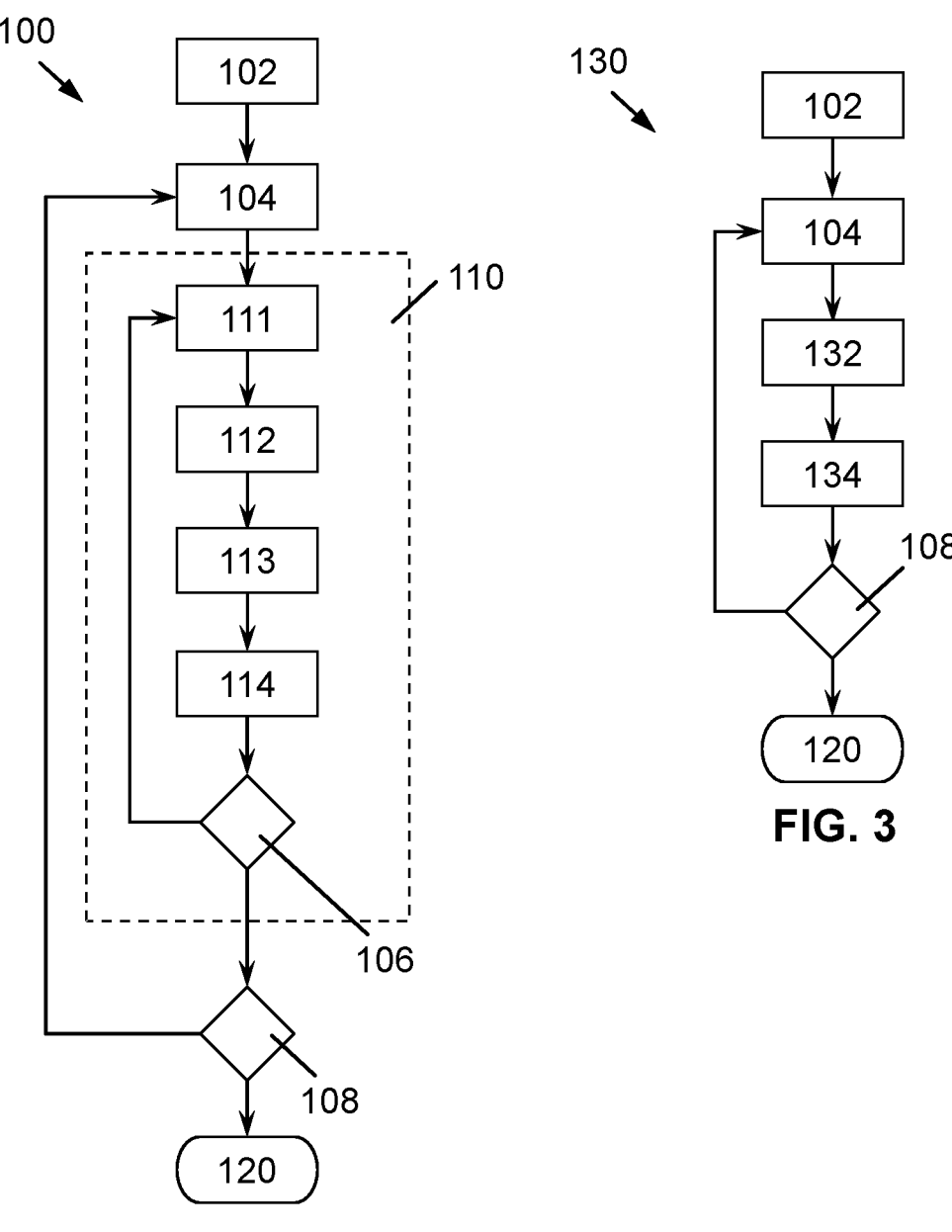
FIG. 2
FIG. 3

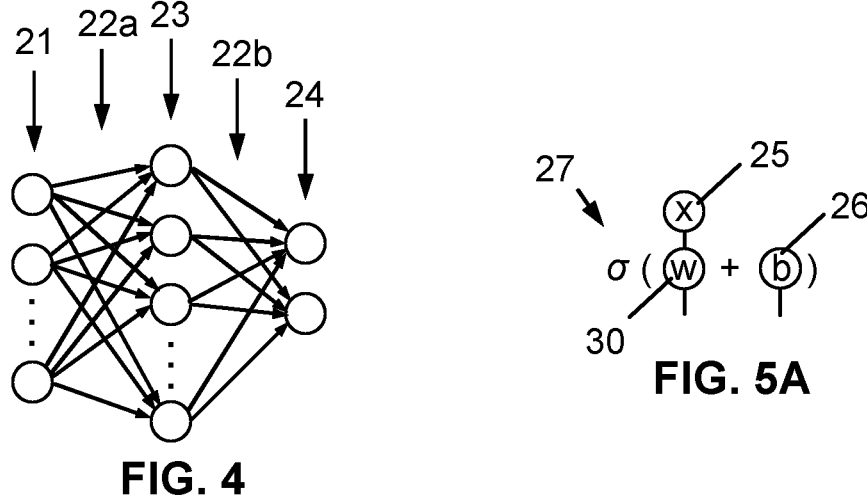
FIG. 4
FIG. 5A
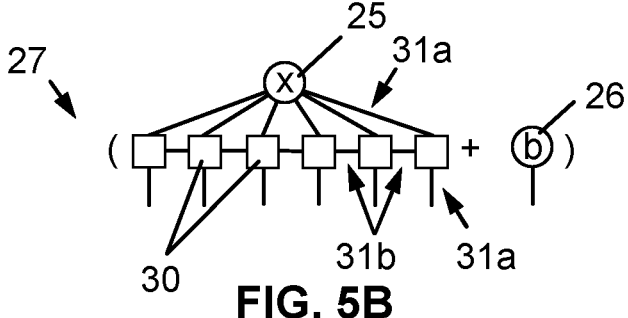
FIG. 5B
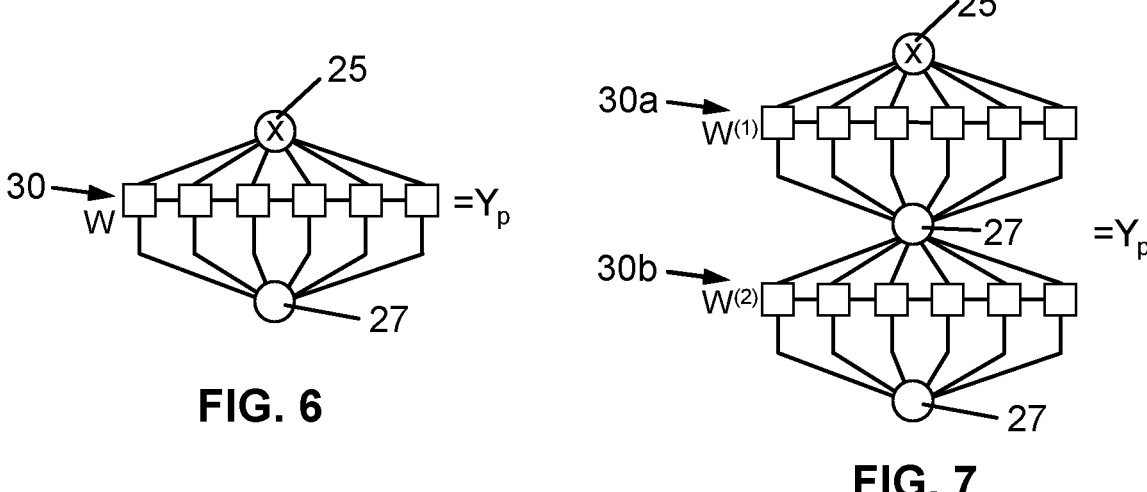
FIG. 6
FIG. 7

FIG. 8A          FIG. 8B

DETERMINATION OF CONDITION OR CHARACTERISTIC OF A TARGET

TECHNICAL FIELD

The present disclosure relates to the field of monitoring. More specifically, it relates to determination of condition or characteristics of a monitored target by means of a neural network based on tensor network(s).

BACKGROUND

Machine learning and artificial intelligence algorithms have been steadily growing in popularity as tools for solving day-to-day tasks that are either complex and/or monotonous. Neural networks are one of these tools that nowadays is present in many industries and applications.

Classical neural networks are formed by a combination of weight matrices and activation functions that ultimately define the relationship between the input and output vectors of the neural networks. One or several hidden layers can exist in each classical neural network, with each hidden layer including a plurality of neurons.

The number of hidden layers and/or the number of neurons within the classical neural networks have/has increased as the time has gone by for the neural network to be capable of coping with problems whose data sets have many features, and/or for the neural network to be capable of achieving a degree of accuracy in the results it provides as required in many fields.

With more and more neurons and hidden layers, the weight matrices have become really large, even really large for the standards of current state-of-the-art computing devices. This, in turn, imposes twofold limitations in the computing devices that are to run the neural network because: the memory of the computing devices may not store the entire weight matrices on the one hand, and the training of the neural network requires long processing times or the training does not make the result of the neural network converge sufficiently. Accordingly, the neural network does not achieve its goal, which is determining some particularity about a target.

A new, more efficient way of monitoring and, eventually, controlling a target that has a set of data associated therewith is deemed necessary for computing devices to be capable of conducting it.

SUMMARY

A first aspect of the disclosure relates to a method for monitoring a target. The target is one of a process, a machine and a system.

The method includes: receiving, by at least one processor, a set of data associated with the target, the set of data having N features, where N is a natural number greater than one; inputting, by the at least one processor, the N features of the received set of data into a neural network, the neural network being trained for determining a condition or characteristic of the target with a plurality of sets of historical data associated with the target, each set of the plurality of sets of historical data having N features, the neural network at least having N inputs and one or more outputs; and, after the step of inputting, determining, by the at least one processor, a condition or characteristic of the target by processing the one or more outputs.

The neural network has one or more hidden layers, each hidden layer is a tensor network in the form of a matrix product operator, MPO, with a respective plurality of tensors and has a respective predetermined activation function per hidden layer or per tensor in the MPO.

The method makes possible to determine the condition, namely status, or a characteristic of the target in an effective manner with the neural network that includes at least one tensor network.

The tensor network or networks replace the weight matrices that are present in classical neural networks. For a given number of hidden layers and respective number of neurons of a classical neural network, a computing device or system with the at least one processor and memory can generally store, train and process a tensor neural network having the same number of hidden layers (tensor networks) and respective number of neurons (tensors). That, in turn, enables the storage, training and processing of tensor neural networks whose counterpart classical neural networks might not be stored, trained and/or processed by a same computing device owing to the greater memory and processing requirements of the later. Or in other words, with a tensor neural network a target can be modeled with a more complex neural network, thereby making possible to make a more accurate determination of the condition or characteristic about the target.

The MPOs include rank 4 tensors. Two dimensions of the tensors are considered as physical dimensions and are conditioned to the input and output of the respective tensor, for instance when there is only one hidden layer the physical dimensions are conditioned by the number of inputs and the number of outputs of the neural network, i.e. input and output vectors. The two remaining dimensions of the tensors are virtual dimensions in accordance with neighboring tensors and they are dependable on the correlation of different parts of the data, namely quantum correlation that corresponds to entanglement in physics; the tensors at ends of the tensor network are thus rank 3 tensors with just one virtual dimension.

Accuracy of the tensor neural network can be controlled by way of the size of virtual bonds of the tensors (the bonds in the virtual dimensions). The larger the virtual bonds, the lower the compression rate, and as such the computational burden of running the neural network is greater.

The set of data and sets of historical data can be diverse, e.g. sensor data, data manually introduced by personnel, data about the environment that the target is in, etc. The data represents features about the target that are to be processed with the neural network.

In the context of the present disclosure, the term "at least one processor" refers to one or more classical processors (e.g. central processing unit, graphical processing unit, digital signal processor, field-programmable gate array, etc.), whereas the term "quantum device" refers to a quantum device or one or more quantum processors. Some steps of methods according to the present disclosure can be performed by quantum devices, which generally results in shorter processing times.

In some embodiments, the method further includes, after the step of determining, providing a predetermined command, by the at least one processor, at least based on the determined condition or characteristic.

As a result of the monitoring of the target by way of the processing of the set or sets of data and determination of the condition or characteristics thereof, it may be determined that the target is or is not behaving or operating adequately and some command is to be run according to that situation.

For example, the target may have reached a desired behavior or operation and that event should be logged, or notified to a device, or the target is underperforming and some changes are to be effected to attempt to make the process, machine or system to behave or operate differently, or halted altogether. Predetermined commands may be provided accordingly. To that end, the at least one processor assesses the determined condition or characteristic with respect to data indicative of predetermined set of conditions or characteristics associated with particular predetermined commands (or lack of predetermined commands when nothing is to be performed) so that it determines which predetermined command or commands, if any, it is to run. The data can be registered in a memory of the computing device or system having the at least one processor, or be registered in e.g. a server that the at least one processor accesses.

In some embodiments, the predetermined command includes one or both of: providing a notification indicative of the determined condition or characteristic to an electronic device; and providing a command to a controlling device or system associated with the target or to the target itself when the target is either a machine or a system, the command being for changing a behavior of the target.

In some embodiments, the set of data includes digitized measurements of at least one sensor associated with the target.

In some embodiments, all the steps of the method are carried out by at least one processor and the method is a computer-implemented method.

A second aspect of the disclosure relates to a method for training a neural network for determining a condition or characteristic of a target. The target is one of a process, a machine and a system. The neural network at least has N inputs and one or more outputs, where N is a natural number greater than one. The neural network also has one or more hidden layers, each hidden layer being a tensor network in the form of a matrix product operator, MPO, with a respective plurality of tensors and having a respective predetermined activation function per hidden layer or per tensor in the MPO.

The method includes: inputting, by at least one processor, N features of each set of historical data of a plurality of sets of historical data associated with the target into the neural network; and one or more iterations of the following steps up until one or more predetermined criteria are fulfilled:

computing, by the at least one processor or a quantum device, a predicted value of the neural network in a forward pass of the neural network; sequentially carrying out the following processing for each possible pair of adjacent tensors in the MPO of each hidden layer up until all possible pairs of adjacent tensors in the MPO of each hidden layer have been processed starting from one end of each MPO and arriving at the other end of each MPO: grouping, by the at least one processor or the quantum device, the pair of adjacent tensors thereby providing a grouped tensor; computing, by the at least one processor, a gradient for the grouped tensor with respect to a predetermined loss function in a backward pass of the neural network; updating, by the at least one processor or the quantum device, the grouped tensor by combining the grouped tensor with the computed gradient for the grouped tensor; and ungrouping, by the at least one processor or the quantum device, the updated grouped tensor with singular value decomposition.

The neural network with one or more tensor networks can be trained with a process whereby the tensors of each tensor network are swept to form a composition of pairs of tensors, update the values of the pair of tensors, and decompose the pair of tensors to have the tensor network as originally defined but with updated values in the tensors already updated.

All the tensors are modified at least once to make the neural network provide a result, i.e. the predicted value, that is more accurate according to some cost function. The predetermined criterion or criteria to be fulfilled can be any known in the art for training neural networks, e.g. reaching an error value between a predicted value and a correct value below a predetermined threshold, reaching a convergence in the training that falls within a predetermined range or a convergence value is below a predetermined threshold, a number of iterations has been reached, etc.

In each iteration or pass, all pairs of adjacent tensors are selected once by sweeping from one end of the tensor network to the other end. Each selected pair of adjacent tensors is grouped together into a combined or grouped tensor. The resulting tensor has its values adjusted by computing the gradient thereof based on a loss function to be improved; to this end, the gradient of the grouped tensor is combined with the grouped tensor to provide the updated version of the grouped tensor. Then, the updated grouped tensor is converted back into two tensors so as to maintain the original structure of the tensor network, something that is performed by means of singular value decomposition, SVD, which is a technique known in the art. As a result, the two tensors resulting from the decomposition have their respective values improved.

Further, since in each iteration there is a sweep to repeat this process with respect to each pair of adjacent tensors, one of the tensors resulting from the decomposition is again improved because it will form another pair of adjacent tensors with its other adjacent tensor. The only tensors that are not updated twice per iteration or pass are the tensors at the ends of the tensor network.

The neural network is improved by conducting more iterations or passes in the training process.

In some embodiments, the one or more iterations includes two or more iterations, and, in each iteration, the sequential processing of all possible pairs of adjacent tensors in the MPO of each hidden layer starts from a different one of the two ends of the MPO of the respective hidden layer so that the grouping of pairs of adjacent tensors is reversed.

The reversing of the sweeps with each iteration results in a more effective training of the neural network when compared to a training with sweeps in the same direction in each iteration.

In some embodiments, the method further includes, prior to the step of computing the gradient, computing, by the at least one processor or the quantum device, an environment tensor at each side of the grouped tensor having at least one tensor in the MPO.

The computation of the gradient is computationally costly owing to the forward pass calculation of the predicted value for each tensor network after performing each grouping of pair of tensors. Said value calculation has to be made for all tensors, thus with each grouping there are a number of calculations of the predicted value, which takes time and spends processing resources, namely energy.

After the pair of tensors is grouped, the environment tensors at each side of the grouped tensor can be computed so as to reduce the number of tensors at each side to just one. Then, the forward pass value calculation is performed fewer times, thereby reducing the time and resources needed for processing each pair of tensors. Afterwards, the gradient can be computed in a backward pass.

The environment tensors are computed as the contraction of all the tensors that are to be grouped together in the respective environment tensors. Tensor contraction can be computed in several ways, one of which being that disclosed in patent application U.S. Ser. No. 17/563,377, which is incorporated by reference in its entirety.

In some embodiments, the singular value decomposition is carried out such that virtual bonds of the updated group tensor are truncated and only a predetermined number of singular values are kept, wherein the predetermined number of singular values kept are the largest singular values.

The truncation of the virtual bonds, i.e. internal indices, of the tensor to keep a certain number of largest singular values only makes possible to control the precision of the neural network in exchange of processing power needed for running the neural network. In this sense, the more singular values are maintained, the greater the precision of the neural network but the greater the computational burden for running it. So by establishing a predetermined number of singular values adequate for the sets of data about the target and the outputs desired, the performance of the neural network can be adjusted to find a balance between precision and computational burden.

A third aspect of the disclosure relates to a method for training a neural network for determining a condition or characteristic of a target. The target is one of a process, a machine and a system. The neural network at least has N inputs and one or more outputs, where N is a natural number greater than one. The neural network also has one or more hidden layers, each hidden layer being a tensor network in the form of a matrix product operator, MPO, with a respective plurality of tensors and having a respective predetermined activation function per hidden layer or per tensor in the MPO.

The method includes: inputting, by at least one processor, N features of each set of historical data of a plurality of sets of historical data associated with the target into the neural network; and one or more iterations of the following steps until one or more predetermined criteria are fulfilled: computing, by the at least one processor, a predicted value of the neural network in a forward pass of the neural network; computing, by the at least one processor, a gradient for each tensor in the MPO of each hidden layer with respect to a predetermined loss function in a backward pass of the neural network; and updating, by the at least one processor, values of each tensor in the MPO of each hidden layer with gradient descent.

The neural network with one or more tensor networks can be trained with a process of gradient descent with the calculation of gradients in backward passes of the neural network. The implementation of such training procedure is typically simpler than the training method of the second aspect, yet the result of the training generally yields less precise neural networks than networks trained with the method of the second aspect.

In some embodiments of any one of the second and third aspects, in the step of computing the predicted value, the predicted value is computed as a contraction of the tensor network of all the hidden layers.

An advantage of the tensor neural network is that the computation of the predicted value in forward passes can be simplified by way of a contraction of the tensor network, or the contraction of the tensor networks when there are multiple hidden layers. This, in turn, simplifies the training process as fewer processing operations have to be conducted, less energy has to be used, and it takes less time to train the neural network.

In some embodiments of any one of the second and third aspects, the method further includes, prior to any step of inputting: determining, by the at least one processor, a degree of correlation between the N features of any set of historical data to be inputted into the neural network; and when the degree of correlation is below a predetermined correlation threshold, decomposing, by the at least one processor or the quantum device, the N features of each set of historical data to be inputted into the neural network by local contraction of each feature, and converting each tensor of the MPO of a first hidden layer connected with an input layer of the neural network into a matrix product state tensor based on the local contraction of the features.

When the features to be inputted into the neural network have a low degree of correlation between each other, e.g. a correlation below 10% or less, preferably below 5% or less, the computational cost of the neural network can be reduced by transforming the MPO of the first hidden layer into a matrix product state, MPS, whereby the tensors are rank 3.

The features of the input vector may be decomposed and numerically evaluated to determine the degree of correlation between all the features. In this sense, the possibility of evaluating multiple sets of historical data provides a better assessment about the degree of correlation.

Although the process involves making the assessment of the correlation and, if low, making the conversion of the MPO to the MPS, the time and resources these processing require is less than that corresponding to processing an MPO rather than an MPS.

In some embodiments of any one of the first, second and third aspects, the target includes one of: an electrical grid, an electricity network (e.g. of a building, of a street, of a neighborhood, etc.), a portfolio of financial assets or derivatives, a stock market, a system of devices and/or machines (e.g. of a factory, of an industrial installation, etc.), or a set of patients of a hospital unit (e.g. intensive care unit, non-intensive care unit, etc.).

By way of example: when the target relates to the electrical grid or electricity network, the neural network may provide data for optimization of the energy markets offer, or for predictive maintenance of the different devices of the grid/network; when the target relates to the stock market, the neural network may predict their evolution, whereas when it relates to a portfolio of financial assets or derivatives, the neural network may optimize it or provide data for pricing or deep hedging; when the target relates to the system of devices and/or machines, the neural network may determine whether the system is functioning correctly, and/or whether predictive maintenance needs to be conducted because a device/machine might stop working; and when the target relates to the set of patients, the neural network may predict the evolution of the patients.

For instance, the set of data about the target might be measurements from a plurality of measurements of the devices and/or machines of the system that measure the behavior or operating condition thereof, or measurements of the patients (with e.g. biosensors). The neural network then provides, for instance, a condition or characteristic of the system indicative of whether a device or machine is expected to malfunction in a predetermined time horizon (e.g. one hour, ten hours, one day, etc.), or indicative of whether a patient is expected to have a seizure or crisis in a predetermined time horizon (e.g. half hour, one hour, three hours, etc.).

In some embodiments of any one of the first, second and third aspects, the MPO of each hidden layer includes a respective bias.

The bias can be e.g. a vector, or components of tensors in a tensor network. As known in the art, biases influence the predicted value of neural networks. In tensor neural networks biases may also exist.

In some embodiments of any one of the first, second and third aspects, all the steps of the method that can be carried out by the quantum device are carried out by the quantum device.

The use of the quantum device in as many steps as possible increases the speed with which the method is conducted.

A fourth aspect of the disclosure relates to a data processing device or system including means for carrying out the steps of a method according to any one of the first, second and third aspects.

In some embodiments, the device or system further includes the target.

In some embodiments, the device or system further includes a quantum device.

A fifth aspect of the disclosure relates to a controlling device or system including: a data processing device or system according to the fourth aspect, or means adapted to execute the steps of a method according to any one of the first, second and third aspects.

In some embodiments, the controlling device or system further includes the target.

A sixth aspect of the disclosure relates to a device or system including: at least one processor, and at least one memory including computer program code for one or more programs; the at least one processor, the at least one memory, and the computer program code configured to cause the device or system to at least carry out the steps of a method according to any one of the first, second and third aspects.

A seventh aspect of the disclosure relates to a computer program product including instructions which, when the program is executed by a computer, cause the computer to carry out the steps of a method according to any one of the first, second and third aspects.

An eighth aspect of the disclosure relates to a non-transitory computer-readable medium encoded with instructions that, when executed by at least one processor or hardware, perform or make a device to perform the steps of a method according to any one of the first, second and third aspects.

A ninth aspect of the disclosure relates to a computer-readable data carrier having stored thereon a computer program product according to the seventh aspect.

Similar advantages as those described with respect to the first, second and third aspects of the disclosure also apply to the remaining aspects.

BRIEF DESCRIPTION OF THE DRAWINGS

To complete the description and in order to provide for a better understanding of the disclosure, a set of drawings is provided. Said drawings form an integral part of the description and illustrate embodiments, which should not be interpreted as restricting the scope of the disclosure, but just as examples of how the disclosed methods or entities can be carried out. The drawings comprise the following figures:

FIG. 1 diagrammatically shows a computing apparatus or system 10 in accordance with some embodiments.

FIGS. 2 and 3 show methods in accordance with embodiments.

FIG. 4 shows a classical neural network.

FIGS. 5A, 5B, 6 and 7 show exemplary tensor neural networks as used in methods in accordance with some embodiments.

FIGS. 8A-8C show grouping of tensors and gradient computation for a grouped pair of tensors as done in methods in accordance with some embodiments.

DESCRIPTION OF EMBODIMENTS

Figure 8C:
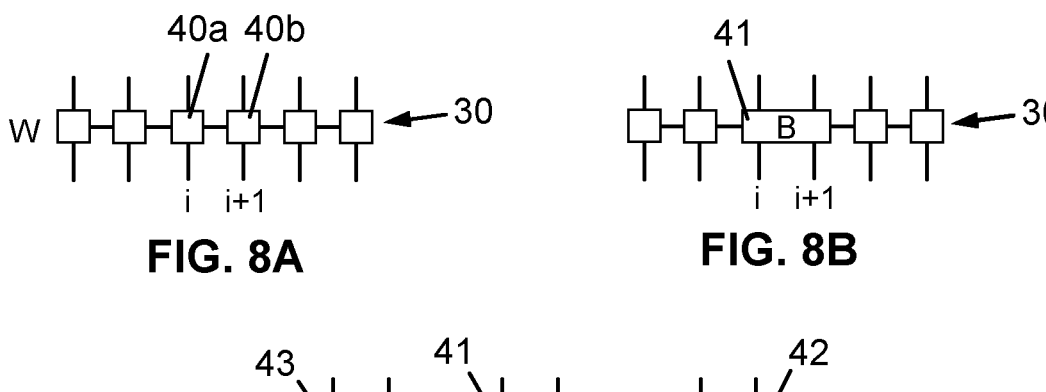

FIG. 1 diagrammatically shows a computing apparatus or system 10 in accordance with embodiments. Methods according to the present disclosure can be carried out by such an apparatus or system 10.

The apparatus or system 10 comprises at least one processor 11, namely at least one classical processor, at least one memory 12, a communications module 13 at least configured to receive data from and transmit data to other apparatuses or systems in wired or wireless form, thereby making possible to e.g. receive sets of data about a target in the form of electrical signals, either in analog form, in which case the apparatus or system 10 digitizes them, or in digital form. Optionally, the apparatus or system 10 also comprises at least one quantum device or processor 14, which is shown with dashed lines for illustrating that it is included in some embodiments only. When the at least one quantum device or processor 14 is included, the communications module 13 is also configured to receive data from and transmit data to the at least one quantum device or processor 14 by performing the necessary conversions, if any, to the electrical signals into e.g. light and vice versa; to that end, the communications module 13 may be provided with a converter for adapting electrical signals of the computing device into light for example when the at least one quantum device or processor 14 is photonic, or into another type of signals that the quantum device or processor 14 is adapted to receive. The quantum device or processor 14 could be provided with such a converter as well.

FIG. 2 shows a method 100 for training a neural network, like that of e.g. FIGS. 5A, 5B, 6 and 7, in accordance with embodiments.

The method 100, which can be run by at least one processor or by both at least one processor and at least one quantum device, comprises a step 102 whereby the at least one processor inputs into an input vector of a neural network as many features as inputs are in the input vector, where the features are from a set of historical data associated with a target. Although only one iteration of the inputting 102 is shown, a plurality of sets of historical data is to be inputted 102 into the neural network for training it.

The method 100 comprises a step 104 whereby the at least one processor or a quantum device computes the predicted value of the neural network in a forward pass, which takes into account all weights and activation functions of the neural network to provide the output(s) of the neural network.

The method 100 then comprises a looped step 110, shown with dashed lines for illustrative purposes only, with a plurality of substeps 111-114.

A first substep 111 comprises grouping, by the at least one processor or the quantum device, a pair of adjacent tensors in each respective tensor network to provide a grouped tensor. This is explained in more detail with reference to FIGS. 8A-8C.

A gradient for the grouped tensor in computed in another substep 112. The gradient is computed with respect to a predetermined loss function, and in a backward pass of the neural network. It will be noted that the predetermined loss function can be any known in the art for training neural networks.

In a subsequent substep 113, the at least one processor or the quantum device updates the grouped tensor by combining the grouped tensor with the computed gradient for the grouped tensor, as explained, for instance, with reference to FIG. 8C.

Figure 10:
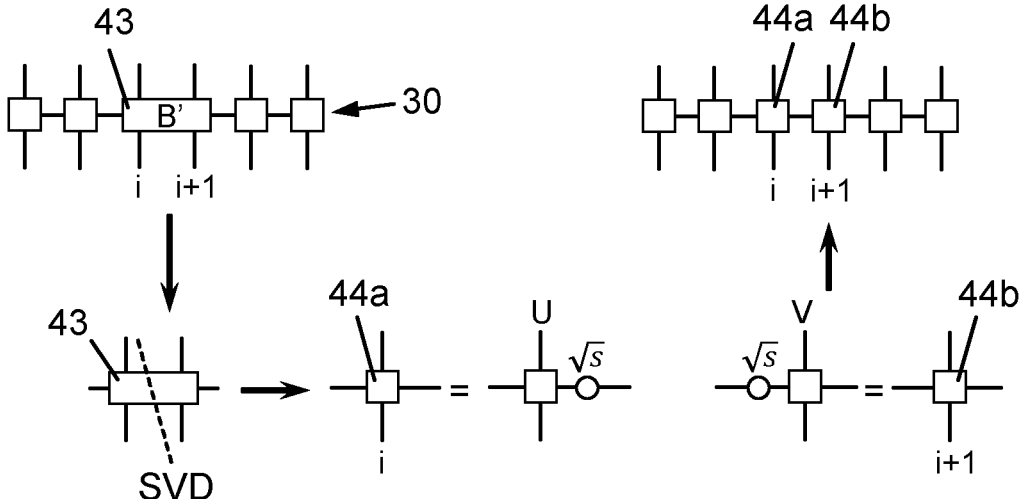
FIG. 10 shows decomposition of a grouped tensor as done in methods in accordance with some embodiments.

Afterwards, in another substep 114, the at least one processor or the quantum device ungroups the updated grouped tensor with singular value decomposition, as explained, for instance, with reference to FIG. 10.

The looped step 110 is repeated depending on first condition 106, which is whether all pairs of adjacent tensors of each tensor network in the neural network have been processed in the fashion of the substeps 111-114. In this sense, step 110 involves sweeping each tensor network such that all possible pair of adjacent tensors are processed at least once. The sweep goes from one end of the tensor network to the other end.

When the sweep(s) are complete, the first condition 106 is fulfilled, and a second condition 108 is checked. The second condition 108 requires that at least one or more predetermined criteria related to the goal of the training itself are met, for example that an error value is less than a predetermined threshold, or certain convergence is achieved.

When the second condition 108 is not fulfilled, the steps 104, 110 are repeated so as to further reduce the error value of the neural network by computing the gradient of all pairs of adjacent tensors within the tensor networks. Conversely, if the second condition 108 is fulfilled, the training of the neural network is ended 120; notwithstanding, the training is ended 120 for the current set of historical data about the target, but the training may be continued with subsequent set or sets of historical data to be inputted 102, if any.

In some embodiments, the step 104 of computing the predicted value of the neural network is a first substep (preceding the grouping substep 111) of the looped step 110, that way the predicted value is computed each time a pair of adjacent tensors is going to be grouped for update thereof. Such repetition of computing the predicted value may attain a more accurate training at the expense of a longer training. To avoid such repetition, the forward pass can be conducted before looping step 110, like in FIG. 2.

FIG. 3 shows a method 130 for training a neural network, like that of e.g. FIGS. 5A, 5B, 6 and 7, in accordance with embodiments.

The method 130, which can be run by at least one processor or by both at least one processor and at least one quantum device, comprises the step 102 as described above.

The method 130 then comprises a step 104 as described above.

The method 130 comprises a step 132 whereby the at least one processor computes a gradient for each tensor in the tensor network of each hidden layer of the neural network. The gradient is computed with respect to a predetermined loss function in a backward pass of the neural network.

The method 130 comprises a step 134 whereby the at least one processor or the quantum device updates values of each tensor in the tensor network of each hidden layer with gradient descent.

Afterwards, the method 100 checks whether condition 108 as described above is fulfilled, if not, the sequence of steps 104, 132, 134 is repeated to further improve the tensors in the tensor network(s) of the neural network. When the condition 108 is fulfilled, the training of the neural network is ended 120 at least for the current set of historical data, further training can be conducted with additional sets of historical data, if available.

FIG. 4 shows a classical neural network.

Classical neural networks comprise an input vector 21, an output vector 24, and one or more hidden layers in the form of weights in e.g. matrix form representing the weights 22a, 22b of the neural network, and activation functions 23.

FIGS. 5A and 5B show, in different visual formats, an exemplary tensor neural network as used in methods in accordance with some embodiments.

The tensor neural network has similarities with respect to a classical neural network as illustrated in FIG. 4. The tensor neural network also has an input vector 25 that can be provided in the form of a tensor. The tensor neural network also has an activation function 27 (visually represented in FIGS. 6 and 7) that depends upon a tensor network in the form of an MPO 30 and a bias 26, if any, that is added to the MPO 30 and which may also be present in classical neural networks even if not illustrated in FIG. 4.

Each tensor network or MPO 30 of the tensor neural network is equivalent to a hidden layer of a classical neural network. Each tensor of an MPO 30 includes two external indices or physical dimensions 31a linked to the input and output of the tensor network, and two internal indices or virtual dimensions 31b linked to neighboring tensors, the only exception being the tensors at the edges that only have one internal index or virtual dimension 31b.

FIGS. 6 and 7 show different tensor neural network as used in methods in accordance with some embodiments. Particularly, FIG. 6 shows a single layer tensor neural network due to its only hidden layer in the form of an MPO 30, and FIG. 7 shows a multiple layer tensor neural network to its two hidden layers in the form of respective MPOs 30a, 30b.

Each MPO 30 has an activation function 27 associated therewith. In these examples, the activation function 27 is a linear rectifier, but it will be noted that any activation function 27 known in the art could be used instead without departing from the scope of the present disclosure.

As illustrated in each of FIGS. 6 and 7, the predicted value of each tensor neural network for the given tensor networks is said to be Yp. The predicted value Yp can be computed as the contraction of the complete tensor networks, which is convenient for simplified training of the neural networks.

FIGS. 8A-8C show grouping of tensors and gradient computation for a grouped pair of tensors as done in methods in accordance with some embodiments.

In this example, the sweep arrives at tensors 40a, 40b and denoted i and i+1 of the MPO 30. The two tensors 40a, 40b are adjacent as they are sharing the virtual bond therebetween. The two tensors 40a, 40b are grouped into a grouped tensor 41, denoted B, by making the contraction of the two tensors 40a, 40b.

Once the two tensors 40a, 40b have been grouped, the grouped tensor 41 is treated as a single tensor. Then, the gradient 42, denoted AB, for the grouped tensor 41 can be computed. The gradient 42 can then be added to the grouped tensor 41 to provide an updated grouped tensor 43, denoted B'.

The same procedure is repeated for each pair of adjacent tensors as the entire MPO is swept.

Figure 9A:
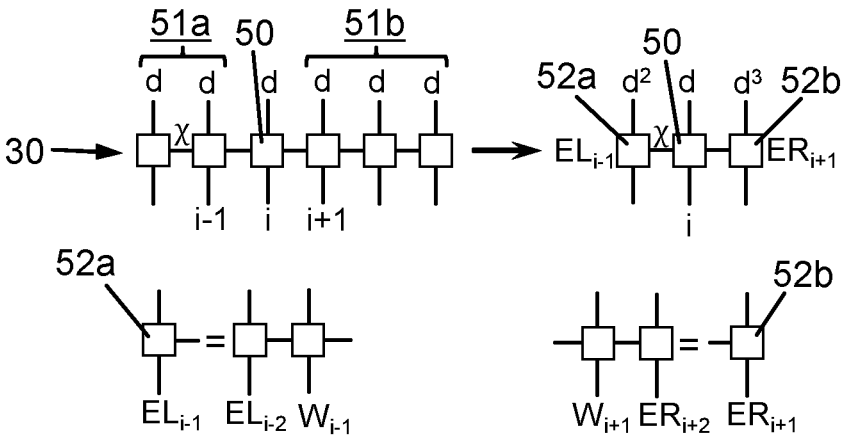
FIGS. 9A-9B show computation of environment tensors as done in methods in accordance with some embodiments.
Figure 9B:
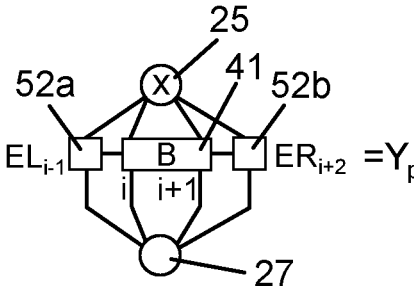

FIGS. 9A-9B show computation of environment tensors 52a, 52b as done in methods in accordance with some embodiments.

An MPO 30 is shown at the top left part of the figure. In said MPO 30, a tensor 50 denoted i is illustrated. At each side, there are a number of tensors. Particularly, at the left side there are two tensors 51a, and at the right side there are three tensors 51b.

In some step or steps of methods in accordance with embodiments, the computation of environment tensors 52a, 52b, denoted EL and ER (the acronyms corresponding to environment left and environment right for the sake of clarity only) is convenient for simplifying the processing required for the training of the tensor neural network.

With reference to the example of FIGS. 9A and 9B, the tensors 51a, 51b at the sides of tensor 50 i are to be converted into environment tensors 52a, 52b. To this end, the contraction of the respective tensors 51a, 51b is computed, thereby producing environment tensors 52a, 52b taking the spot of the respective tensors 51a, 51b. As it can be appreciated, the environment tensors 52a, 52b are connected with the tensor 50 i by way of virtual bonds.

When there is no tensor at one side of the tensor 50 i, or there is only one tensor, then no environment tensor needs to be computed since there is none, or the tensor itself is equivalent to the environment tensor.

As it can be appreciated from FIG. 9B, the tensor 50 i can be a grouped tensor as described with reference to e.g. FIGS. 8A-8C. In that case, the tensors at each side of the grouped tensor are considered for contraction. With the environment tensors 52a, 52b in the MPO 30, the overall contraction of the tensor neural network of FIG. 9B provides the predicted value thereof, in this case Yp.

FIG. 10 shows decomposition of a grouped tensor as done in methods in accordance with some embodiments.

In this example, the updated grouped tensor 43, denoted B', of FIG. 8C is to be decomposed so that the MPO 30 includes as many tensors as it had before processing the pair of adjacent tensors and converting it into a grouped tensor 43.

The tensor B' 43 is decomposed by way of SVD into two tensors 44a, 44b. When the tensors 44a, 44b are provided, they are placed back into the MPO 30 in the position where the updated grouped tensor 43 was.

The virtual bonds of the tensors 44a, 44b is to be controlled by way of the number of largest singular values that are kept during the SVD. That way, the precision of the neural network depends on said number of largest singular values.

Figure 11:
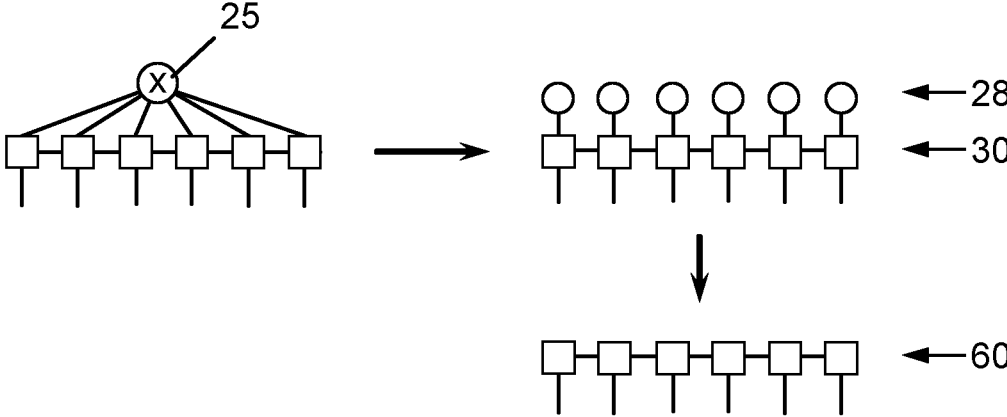
FIG. 11 shows conversion of an MPO to an MPS as done in methods in accordance with some embodiments.

FIG. 11 shows conversion of an MPO 30 to an MPS 60 as done in methods in accordance with some embodiments.

The conversion is performed in some embodiments when it is determined that the features of the input vector 25 have low correlation among themselves. In that case, preferably the input vector 25 is decomposed to decoupled tensors 28. The decoupled tensors 28 are contracted with weights of the tensors of the MPO 30, to provide the MPS 60.

The MPS 60 has tensors of rank 3 owing to the lack of one of the two external indices or physical dimensions. The processing of the MPS 60 is computationally more cost-effective than that of the MPO 30.

In this text, the terms "includes", "comprises", and their derivations—such as "including", "comprising", etc.—should not be understood in an excluding sense, that is, these terms should not be interpreted as excluding the possibility that what is described and defined may include further elements, steps, etc.

On the other hand, the disclosure is obviously not limited to the specific embodiment(s) described herein, but also encompasses any variations that may be considered by any person skilled in the art—for example, as regards the choice of materials, dimensions, components, configuration, etc.—, within the general scope of the disclosure as defined in the claims.

The invention claimed is:

1. A device or system comprising:

a communications module configured to receive data from and transmit data to other devices or systems; at least one processor; and at least one memory comprising computer program code for one or more programs;

the at least one processor, the at least one memory, and the computer program code being configured to cause the device or system to at least carry out the following for training a neural network for determining a condition or characteristic of a monitored target:

inputting N features of each set of historical data of a plurality of sets of historical data associated with the monitored target into the neural network, the neural network at least having N inputs and one or more outputs, where N is a natural number greater than one, the neural network having one or more hidden layers, each hidden layer being a tensor network in the form of a matrix product operator, MPO, with a respective plurality of tensors and having a respective predetermined activation function per hidden layer or per tensor in the MPO; and one or more iterations of the following steps up until one or more predetermined criteria are fulfilled:

computing a predicted value of the neural network in a forward pass of the neural network; and sequentially carrying out the following processing for each possible pair of adjacent tensors in the MPO of each hidden layer up until all possible pairs of adjacent tensors in the MPO of each hidden layer have been processed starting from one end of each MPO and arriving at the other end of each MPO:

grouping the pair of adjacent tensors thereby providing a grouped tensor;

computing a gradient for the grouped tensor with respect to a predetermined loss function in a backward pass of the neural network;

updating the grouped tensor by combining the grouped tensor with the computed gradient for the grouped tensor; and ungrouping the updated grouped tensor with singular value decomposition; and wherein the at least one processor, the at least one memory, and the computer program code are configured to further cause the device or system to at least carry out the following after having trained the neural network:

receiving a set of data associated with the monitored target, the set of data having N features;

inputting the N features of the received set of data into the trained neural network;

after inputting the N features into the trained neural network, determining a condition or characteristic of the target by processing the one or more outputs; and providing a predetermined command at least based on the determined condition or characteristic, wherein the predetermined command includes one or both of:

providing a notification indicative of the determined condition or characteristic to an electronic device; and providing a command to a controlling device or system associated with the target, the command being for changing a behavior of the target.

2. The device or system of claim 1, wherein the one or more iterations comprises two or more iterations, and wherein, in each iteration, the sequential processing of all possible pairs of adjacent tensors in the MPO of each hidden layer starts from a different one of the two ends of the MPO of the respective hidden layer so that the grouping of pairs of adjacent tensors is reversed.

3. The device or system of claim 1, wherein the at least one processor, the at least one memory, and the computer program code are configured to further cause the device or system to at least carry out the following: prior to computing the gradient, computing an environment tensor at each side of the grouped tensor having at least one tensor in the MPO.

4. The device or system of claim 1, wherein the singular value decomposition is carried out such that virtual bonds of the updated group tensor are truncated and only a predetermined number of singular values are kept, wherein the predetermined number of singular values kept are the largest singular values.

5. The device or system of claim 1, wherein the at least one processor, the at least one memory, and the computer program code are configured to further cause the device or system to at least carry out the following prior to any inputting:

determining a degree of correlation between the N features of any set of historical data to be inputted into the neural network; and when the degree of correlation is below a predetermined correlation threshold, decomposing the N features of each set of historical data to be inputted into the neural network by local contraction of each feature, and converting each tensor of the MPO of a first hidden layer connected with an input layer of the neural network into a matrix product state tensor based on the local contraction of the features.

6. The device or system of claim 1, wherein the at least one processor comprises one or more classical processors and one or more quantum processors.

7. The device or system of claim 1, wherein the target comprises: an electrical grid, an electricity network, a portfolio of financial assets or derivatives, a stock market, a set of patients of a hospital unit, or a system of devices and/or machines.

8. A device or system comprising:

a communications module configured to receive data from and transmit data to other devices or systems;

at least one processor; and at least one memory comprising computer program code for one or more programs;

the at least one processor, the at least one memory, and the computer program code being configured to cause the device or system to at least carry out the following for training a neural network for determining a condition or characteristic of a monitored target:

inputting N features of each set of historical data of a plurality of sets of historical data associated with the monitored target into the neural network, the neural network at least having N inputs and one or more outputs, where N is a natural number greater than one, the neural network having one or more hidden layers, each hidden layer being a tensor network in the form of a matrix product operator, MPO, with a respective plurality of tensors and having a respective predetermined activation function per hidden layer or per tensor in the MPO; and one or more iterations of the following steps until one or more predetermined criteria are fulfilled:

computing a predicted value of the neural network in a forward pass of the neural network;

computing a gradient for each tensor in the MPO of each hidden layer with respect to a predetermined loss function in a backward pass of the neural network; and updating values of each tensor in the MPO of each hidden layer with gradient descent;

and wherein the at least one processor, the at least one memory, and the computer program code are configured to further cause the device or system to at least carry out the following after having trained the neural network:

receiving a set of data associated with the monitored target, the set of data having N features;

inputting the N features of the received set of data into the trained neural network;

after inputting the N features into the trained neural network, determining a condition or characteristic of the target by processing the one or more outputs; and providing a predetermined command at least based on the determined condition or characteristic, wherein the predetermined command includes one or both of:

providing a notification indicative of the determined condition or characteristic to an electronic device; and providing a command to a controlling device or system associated with the monitored target, the command being for changing a behavior of the target.

9. The device or system of claim 8, wherein the predicted value is computed as a contraction of the tensor network of all the hidden layers.

10. The device or system of claim 8, wherein the at least one processor, the at least one memory, and the computer program code are configured to further cause the device or system to at least carry out the following prior to any inputting:

determining a degree of correlation between the N features of any set of historical data to be inputted into the neural network; and when the degree of correlation is below a predetermined correlation threshold, decomposing the N features of each set of historical data to be inputted into the neural network by local contraction of each feature, and converting each tensor of the MPO of a first hidden layer connected with an input layer of the neural network into a matrix product state tensor based on the local contraction of the features.

11. The device or system of claim 8, wherein the at least one processor, the at least one memory, and the computer program code are configured to further cause the device or system to at least carry out the following after having trained the neural network:

receiving a set of data associated with a monitored target, the set of data having N features, where N is a natural number greater than one;

inputting the N features of the received set of data into a neural network, the neural network being for determining a condition or characteristic of the target with a plurality of sets of historical data associated with the target, each set of the plurality of sets of historical data having N features, the neural network at least having N inputs and one or more outputs, the neural network having one or more hidden layers, each hidden layer being a tensor network in the form of a matrix product operator, MPO, with a respective plurality of tensors and having a respective predetermined activation function per hidden layer or per tensor in the MPO; and after inputting the N features into the neural network, determining a condition or characteristic of the target by processing the one or more outputs.

12. The device or system of claim 8, wherein the at least one processor comprises one or more classical processors and one or more quantum processors.

13. The device or system of claim 8, wherein the target comprises: an electrical grid, an electricity network, a portfolio of financial assets or derivatives, a stock market, a set of patients of a hospital unit, or a system of devices and/or machines.

* * * * *